United States Patent
Ota et al.

(10) Patent No.: US 9,020,716 B2
(45) Date of Patent: Apr. 28, 2015

(54) CONTROL DEVICE FOR VEHICLE DRIVE DEVICE AND CONTROL METHOD FOR VEHICLE DRIVE DEVICE

(75) Inventors: Keisuke Ota, Toyota (JP); Hitoshi Matsunaga, Anjo (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 719 days.

(21) Appl. No.: 12/700,242

(22) Filed: Feb. 4, 2010

(65) Prior Publication Data

US 2010/0198468 A1 Aug. 5, 2010

(30) Foreign Application Priority Data

Feb. 5, 2009 (JP) .................. 2009-025231

(51) Int. Cl.
*G06F 7/00* (2006.01)
*F02D 41/02* (2006.01)
*F16H 63/50* (2006.01)
*B60W 10/02* (2006.01)
*B60W 10/06* (2006.01)
(Continued)

(52) U.S. Cl.
CPC ............ *F02D 41/023* (2013.01); *F16H 63/502* (2013.01); *B60W 10/026* (2013.01); *B60W 10/06* (2013.01); *B60W 10/11* (2013.01); *B60W 30/19* (2013.01); *B60W 2510/0604* (2013.01); *B60W 2510/0638* (2013.01); *B60W 2510/1015* (2013.01); *B60W 2710/0616* (2013.01); *B60W 2710/0666* (2013.01); *F02D 2250/21* (2013.01)

(58) Field of Classification Search
CPC ......... F16H 63/00; B60W 10/00; F02D 41/00

USPC ........ 701/51, 53–56, 58–61, 64, 66; 477/107, 477/110, 115, 121, 127, 130–132, 143–144, 477/149, 155

See application file for complete search history.

(56) References Cited

U.S. PATENT DOCUMENTS 3,792,631 A * 2/1974 Mori ............................. 477/154
4,188,839 A * 2/1980 Kubo et al. .................. 477/145
4,445,401 A * 5/1984 Ishimaru ...................... 477/144

(Continued)

FOREIGN PATENT DOCUMENTS

JP 6-17672 1/1994
JP 6-17673 1/1994

(Continued)

OTHER PUBLICATIONS

Office Action issued Nov. 24, 2010 in Japan Application No. 2009-025231 (With Partial English Translation).

*Primary Examiner* — John Q Nguyen
*Assistant Examiner* — Michael Ng
(74) *Attorney, Agent, or Firm* — Oblon, McClelland, Maier & Neustadt, L.L.P.

(57) ABSTRACT

A control device for a vehicle drive device that includes a drive source that outputs a drive force for running and an automatic transmission that has multiple speeds, the control device includes: a blipping control device that performs blipping control in which an output torque of the drive source is changed irrespective of an accelerator operation when a manual downshift of the automatic transmission is performed, and that changes a timing to perform next blipping control in a learning manner on the basis of an undershoot amount of a turbine speed at start of shifting of the automatic transmission.

9 Claims, 4 Drawing Sheets

(51) Int. Cl.
    *B60W 10/11*     (2012.01)
    *B60W 30/19*     (2012.01)

(56) References Cited

U.S. PATENT DOCUMENTS

| | | | | |
|---|---|---|---|---|
| 5,036,728 | A * | 8/1991 | Kawasoe et al. | 477/109 |
| 5,092,199 | A * | 3/1992 | Goto et al. | 477/133 |
| 5,133,227 | A * | 7/1992 | Iwatsuki | 477/110 |
| 5,295,415 | A * | 3/1994 | Abe et al. | 477/102 |
| 5,393,279 | A * | 2/1995 | Bota et al. | 477/143 |
| 5,433,676 | A * | 7/1995 | Abe et al. | 477/109 |
| 5,445,577 | A * | 8/1995 | Fujita et al. | 477/120 |
| 5,489,248 | A * | 2/1996 | Tazawa | 477/148 |
| 6,554,741 | B2 * | 4/2003 | Saito | 477/120 |
| 6,625,533 | B2 * | 9/2003 | Katakura et al. | 701/54 |
| 7,393,305 | B2 * | 7/2008 | Yamada et al. | 477/110 |
| 7,470,212 | B2 * | 12/2008 | Inagaki et al. | 477/111 |
| 7,563,196 | B2 * | 7/2009 | Yamada et al. | 477/110 |
| 7,635,316 | B2 * | 12/2009 | Nakajima et al. | 477/107 |
| 2008/0146412 | A1 * | 6/2008 | Sagawa et al. | 477/108 |
| 2010/0197457 | A1 * | 8/2010 | Kuwahara et al. | 477/107 |
| 2010/0332091 | A1 * | 12/2010 | Kato et al. | 701/58 |
| 2011/0230308 | A1 * | 9/2011 | Inoue et al. | 477/54 |

FOREIGN PATENT DOCUMENTS

| | | |
|---|---|---|
| JP | 10-47102 | 2/1998 |
| JP | 11-148386 | 6/1999 |

* cited by examiner

CONTROL DEVICE FOR VEHICLE DRIVE DEVICE AND CONTROL METHOD FOR VEHICLE DRIVE DEVICE

INCORPORATION BY REFERENCE

The disclosure of Japanese Patent Application No. 2009-025231 filed on Feb. 5, 2009 including the specification, drawings and abstract is incorporated herein by reference in its entirety.

BACKGROUND OF THE INVENTION

1. Field of the Invention

The present invention relates to a control device for a vehicle drive device and a control method for the vehicle drive device. In particular, the present invention relates to an improvement for enhancing the response of an automatic transmission while suppressing a shift shock when the automatic transmission is manually downshifted.

2. Description of the Related Art

There is known a vehicle drive device that includes a drive source that outputs a drive force for running, a blipping control device such as an electronic throttle valve that can change an output torque of the drive source irrespective of an accelerator operation, and an automatic transmission that has multi speeds. A technique for blipping control in such a drive device is proposed. In the blipping control, the output torque of the drive source is controlled by the blipping control device when the automatic transmission is manually downshifted. Japanese Patent Application Publication No. 6-17673 (JP-A-6-17673) for example, discloses a shift control device for an automatic transmission using such a technique. According to the technique, an engine output is increased in a downshifting during engine braking, which reduces the time which is required for shifting the transmission.

According to the control of the related art discussed above, however, a shift shock may occur depending on the remaining torque capacity of clutches that is disengaged in the shifting of the automatic transmission. When it is attempted to suppress a shift shock, the response of the automatic transmission may not be enhanced sufficiently. That is, there has been desired development of a control device for a vehicle drive device that enhances the response of an automatic transmission while suppressing a shift shock when the automatic transmission is manually downshifted.

SUMMARY OF THE INVENTION

The present invention provides a control device for a vehicle drive device that enhances the response of an automatic transmission while suppressing a shift shock during a manual downshifting of the automatic transmission.

A first aspect of the present invention provides a control device for a vehicle drive device that includes a drive source that outputs a drive force for running and an automatic transmission that has multiple speeds, the control device includes: a blipping control device that performs blipping control in which an output torque of the drive source is changed irrespective of an accelerator operation when a manual downshift of the automatic transmission is performed, and that changes a timing to perform next blipping control in a learning manner on the basis of an undershoot amount of a turbine speed at start of shifting of the automatic transmission.

With this configuration, when a manual downshift of the automatic transmission is performed, the blipping control device performs blipping control in which the output torque of the drive source is changed, and changes a timing to perform next blipping control in a learning manner on the basis of an undershoot amount of a turbine speed at start of shifting of the automatic transmission. Hence, it is possible to shorten the time which is required for shifting as much as possible in consideration of the torque capacity of clutches disengaged in the shifting of the automatic transmission. That is, it is possible to provide a control device for a vehicle drive device that enhances the response of an automatic transmission while suppressing a shift shock when the automatic transmission is manually downshifted.

The vehicle drive device according to the first aspect may further include a torque converter that is provided between the drive source and the automatic transmission, and the blipping control device may correct a control amount of the output torque of the drive source that is used in the blipping control on the basis of a difference between respective rotational speeds of an input shaft and an output shaft of the torque converter. With this configuration, it is possible to obtain further favorable shifting characteristics by correcting the control amount used by the blipping control device.

A second aspect of the present invention provides a control method for a vehicle drive device that includes a drive source that outputs a drive force for running and an automatic transmission that has multiple speeds, the control method including: performing blipping control in which an output torque of the drive source is changed when a manual downshift of the automatic transmission is performed; and changing a timing to perform next blipping control in a learning manner on the basis of an undershoot amount of a turbine speed at start of shifting of the automatic transmission.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the present invention will be described in detail below with reference to the drawings.

Figure 1:
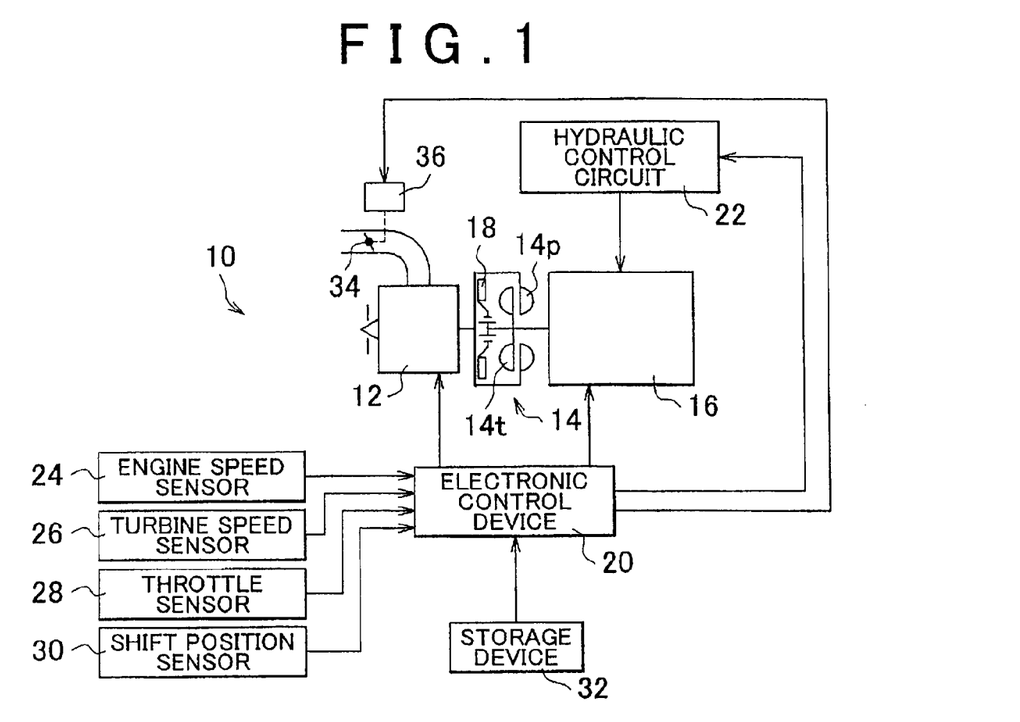
FIG. 1 illustrates a vehicle drive device and its control system according to an embodiment of the present invention.

FIG. 1 illustrates a vehicle drive device 10 and its control system according to an embodiment of the present invention. The drive device 10 shown in FIG. 1 includes an engine 12, a torque converter 14, and an automatic transmission 16, which are arranged in series. A differential gear device, which forms a different part of the drive device 10, is provided between the engine 12 which serves as a drive source (main motive power source) for running and a pair of drive wheels (not shown). The drive device 10 transfers motive power output from the engine 12 to the pair of drive wheels sequentially via the differential gear device and so forth.

The engine 12 is an internal combustion engine such as a gasoline engine or a diesel engine that produces a drive force through combustion of fuel that is injected into cylinders, for example. The torque converter 14 includes a pump wheel 14p that is coupled to a crankshaft of the engine 12 and a turbine wheel 14t that is coupled to the automatic transmission 16 via a turbine shaft which is equivalent to an output-side member. The torque converter 14 is a hydraulic power transmission device that transfers motive power via a fluid. A look-up clutch (lock-up clutch) 18 is provided between the pump wheel 14p and the turbine wheel 14t. The look-up clutch 18 is configured to rotate the pump wheel 14p and the turbine wheel 14t together when the look-up clutch 18 is engaged. The automatic transmission 16 is a multiple-speed automatic transmission mechanism that includes a plurality of hydraulic frictional engagement devices to selectively establish one of multi speeds (gear ratios) in accordance with the combination of engagement and disengagement of the hydraulic frictional engagement devices, for example.

As shown in FIG. 1, the drive device 10 includes an electronic control device 20 that performs various control that is related to the drive device 10 such as output control of the engine 12 and shifting control of the automatic transmission 16. The electronic control device 20 includes a so-called microcomputer that includes a CPU, a RAM, a ROM, and an input/output interface, for example. The CPU is configured to process signals from the devices in accordance with a program that is stored in advance in the ROM while utilizing a temporary storage function of the RAM in order to execute the various control such as output control of the engine 12, shifting control of the automatic transmission 16, and engagement/disengagement control of the lock-up clutch 18. As necessary, the CPU may be configured separately for control of the engine 12 and for control of the automatic transmission 16 or the look-up clutch 18. The drive device 10 also includes a storage device 32 that stores relation that is used in various control performed by the electronic control device 20. The electronic control device 20 executes the various control on the basis of the states of the vehicle obtained from the relation stored in the storage device 32. The drive device 10 further includes a hydraulic control circuit 22 that regulates a hydraulic pressure to a specified level in accordance with a command from the electronic control device 20 in order to perform engagement control of the lock-up clutch 18 in the torque converter 14, shifting control of the automatic transmission 16, and so forth.

As shown in FIG. 1, the electronic control device 20 is configured to receive a signal that indicates a state of the vehicle from various sensors that are provided at various parts of the vehicle. That is, the electronic control device 20 receives a signal that represents an engine speed NE that corresponds to the rotational speed of the engine 12 which is detected by an engine speed sensor 24, a signal that represents a rotational speed NT of the turbine wheel 14t of the torque converter 14 which is detected by a turbine speed sensor 26, that is, an input rotational speed $N_{IN}$ of the automatic transmission 16, a throttle opening signal that represents a throttle opening $\theta_{TH}$ of an electronic throttle valve 34 which is detected by a throttle sensor 28, a signal that represents a shift position $P_{SH}$ that corresponds to the operating position of a shift lever 40 in a shift operation device 38 which is detected by a shift position sensor 30, and so forth.

Also, the electronic control device 20 is configured to output a signal for controlling operation of various parts of the vehicle. That is, the electronic control device 20 outputs, as an engine output control command signal $S_E$ for output control of the engine 12, a throttle signal for driving a throttle actuator 36 that controls opening and closing of the electronic throttle valve 34, an injection signal for controlling the amount of fuel to be injected from a fuel injection device, and an ignition timing signal for controlling the timing of ignition of the engine 12 that is performed by an ignition device, for example. The electronic throttle valve 34 is basically controlled by the electronic control device 20 to the throttle opening $\theta_{TH}$ which corresponds to the amount of depression of an accelerator pedal (not shown) to control the output torque of the engine 12 which serves as a drive source. Further, the electronic throttle valve 34 functions as a blipping control device that can change the output torque of the engine 12 as necessary in accordance with a command from the electronic control device 20 irrespective of an accelerator operation. In order to perform shifting control of the automatic transmission 16, the hydraulic control circuit 22 outputs a control hydraulic pressure for controlling driving of a hydraulic actuator that is provided in the automatic transmission 16 in response to a command signal that is output from the electronic control device 20.

Figure 2:
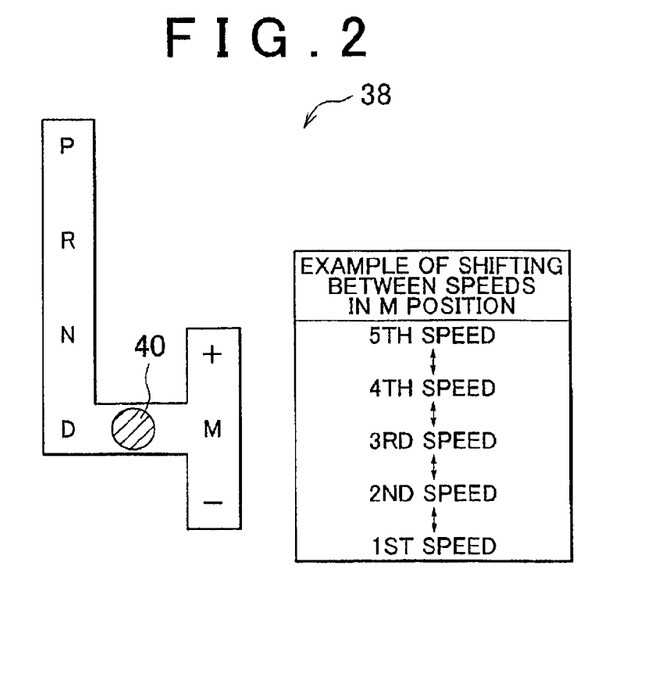
FIG. 2 shows an example of a shift operation device that is provided in the drive device of FIG. 1 and that serves as a switching device that switches between a plurality of shift positions through a manual operation.

FIG. 2 shows an example of the shift operation device 38 which serves as a switching device that switches between a plurality of shift positions $P_{SH}$ through a manual operation. The shift operation device 38 is disposed on a side of a driver's seat, for example, and includes a shift lever 40 that is operable to select one from the plurality of shift positions $P_{SH}$. The shift lever 40 is manually operable to establish any of a parking position "P" in which the power transmission path in the drive device 10 is blocked in a neutral state and an output shaft of the drive device 10 is locked, a reverse position "R" which is used for backward travel, a neutral position "N" in which the power transmission path in the drive device 10 is blocked in the neutral state, a forward automatic transmission position "D" in which automatic shifting control is executed to selectively establish one of a plurality of forward shift speeds in the automatic transmission 16, and a forward manual transmission position "M" in which a manual transmission mode (manual mode) is established to realize shifting between the plurality of speeds in the automatic transmission 16.

The "M" position is provided with an upshift position "+" for shifting up speed range of the transmission each time the shift lever 40 is operated to that position and a downshift position "−" for shifting down the speed range each time the shift lever 40 is operated. The shift lever 40 is unstable at both the upshift position "+" and the downshift position "−", and is automatically returned to the "M" position by urging means such as a spring. The speed range of the transmission is changed in accordance with the number of operations of the shift lever 40 to the upshift position "+" or the downshift position "−", the duration of retention of the shift lever 40 at the upshift position "+" or the downshift position "−", or the like. The "M" mode is equivalent to a manual shifting mode.

The electronic control device 20 performs blipping control in which the output torque of the engine 12 is changed by the electronic throttle valve 34 which serves as a blipping control device when the automatic transmission 16 is manually downshifted, that is, a downshift is performed in response to an operation of the shift lever 40 of the shift operation device 38 with the accelerator pedal is released or with the accelerator pedal is depressed by an amount less than a predetermined amount. For example, in the case where the shift lever 40 of the shift operation device 38 is operated to the "−" position with the accelerator pedal released and a signal that corresponds to the manual downshift operation is detected by the shift position sensor 30, the opening $\theta_{TH}$ of the electronic throttle valve 34 is temporarily increased by a predetermined value to increase the output of the engine 12. Such control shortens the shifting time which is required for a downshift while increasing the rotational speed NE of the engine 12 to suppress a shift shock due to an increase in braking torque. Preferably, the amount by which the electronic throttle valve 34 is opened in the blipping control, that is, the amount of increase in throttle opening in increasing the output of the engine 12, is determined with a view to preventing a decrease in engine brake force or preventing occurrence of an engine drive state during shifting of the automatic transmission 16. For example, in order to make the engine brake force generally equal before and after a downshift, the electronic throttle valve opening $\theta_{TH}$ is set to a value at which a drive force produced using a the speed range before the downshift with the throttle valve 34 fully closed is generally equal to a drive force produced using the speed range after the downshift.

In the blipping control which is performed when the automatic transmission 16 is manually downshifted, the electronic control device 20 performs learning control on the basis of the turbine speed NT. That is, the electronic control device 20 changes the timing to perform the next blipping control in a learning manner on the basis of an undershoot amount $\Delta N_{US}$ of the turbine speed NT (the shortage of an actual measurement value of the turbine speed with respect to its target value) at start of shifting of the automatic transmission 16 (at start of an inertia phase) using relation determined in advance. For example, in the case where the undershoot amount $\Delta N_{US}$ is equal to or more than a predetermined upper limit threshold that is determined in advance and stored in the storage device 32, learning control is performed to advance the timing to start the next blipping control by a predetermined time. On the other hand, in the case where the undershoot amount $\Delta N_{US}$ is less than a predetermined lower limit threshold that is determined in advance and stored in the storage device 32, learning control is performed to delay the timing to start the next blipping control by a predetermined time. The undershoot amount on the basis of the control may be a maximum undershoot rotational speed or an integrated value of the undershoot amount. The turbine speed may be the rotational speed of an input shaft of the automatic transmission 16 to which the output torque of the drive source is input.

Preferably, the electronic control device 20 corrects the control amount of the output torque of the engine 12 that is used in the blipping control on the basis of an input/output rotational speed difference nslp of the torque converter 14, that is, the difference between the engine speed NE which is detected by the engine speed sensor 24 and the turbine speed NT which is detected by the turbine speed sensor 26, using relation determined in advance. For example, such correction is performed to increase the control amount of the electronic throttle valve opening $\theta_{TH}$ to be larger as the input/output rotational speed difference nslp of the torque converter 14 before start of shifting of the automatic transmission 16 is larger, using relation predetermined and stored in the storage device 32. (The electronic control device 20 increases the control amount of the output torque of the drive source to be larger as the difference between the respective rotational speeds of an input shaft and an output shaft of the torque converter 14 before start of shifting is larger.)

Figure 3:
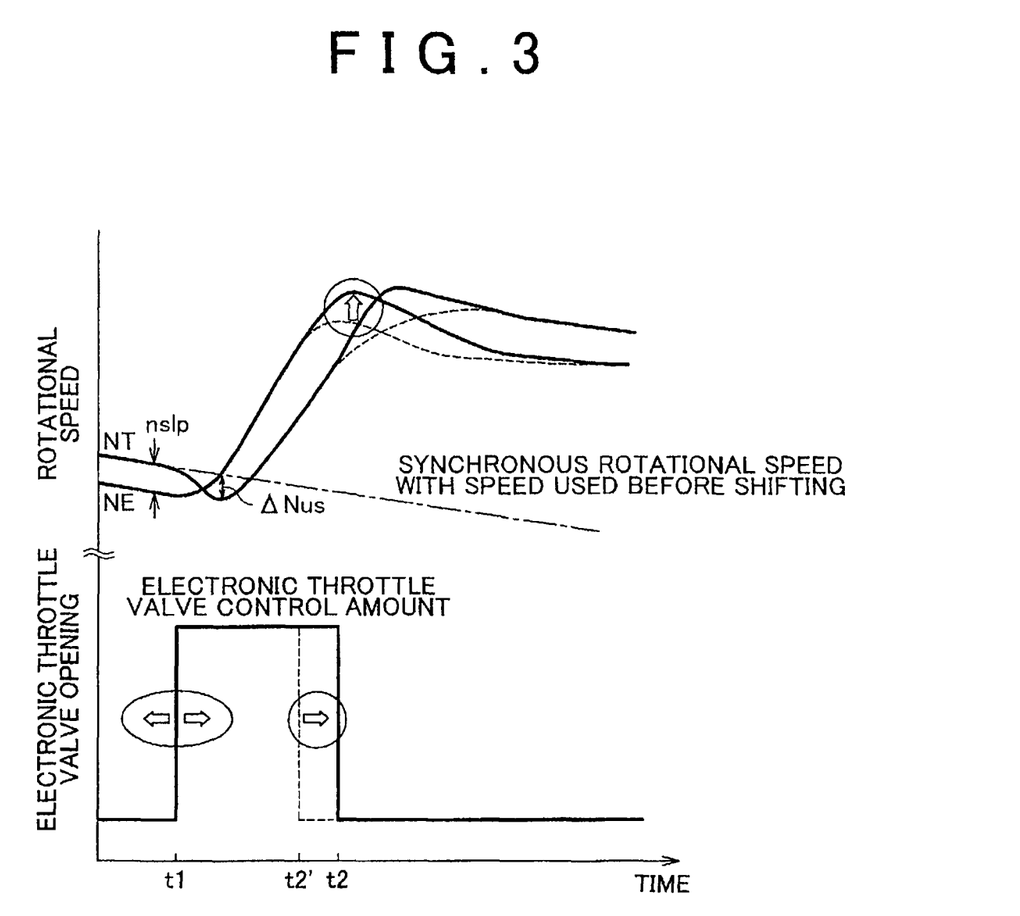
FIG. 3 is a time chart that illustrates blipping control that is performed by an electronic control device that is provided in the drive device of FIG. 1 when an automatic transmission is manually downshifted.

FIG. 3 is a time chart that illustrates blipping control that is performed by the electronic control device 20 when the automatic transmission 16 is manually downshifted. In the blipping control, the output torque of the engine 12 is increased by the electronic throttle valve 34 during a period from time t1 to time t2. That is, the opening $\theta_{TH}$ of the electronic throttle valve 34 is kept increased by a predetermined value during the period from time t1 to time t2. Such control shortens the shifting time which is required for a downshift while increasing the rotational speed NE of the engine 12 to suppress a shift shock due to an increase in braking torque.

In the control according to the embodiment, learning control is executed in which the timing to start the next blipping control, that is, the timing to start control in which the electronic throttle valve opening $\theta_{TH}$ is temporarily increased, on the basis of the undershoot amount $\Delta N_{US}$ of the turbine speed NT at start of an inertia phase in shifting of the automatic transmission 16 shown in FIG. 3, that is, a value of the difference of an actual measurement value of the turbine speed NT from a synchronous rotational speed with a shift speed that is used before the shifting which serves as a target value. Specifically, in the blipping control, learning control is performed on the basis of the undershoot amount $\Delta N_{US}$ so as to shorten the shifting time which is required for a downshift as much as possible while suppressing a shift shock. The control amount of the output torque of the engine 12 that is used in the blipping control is corrected on the basis of the input/output rotational speed difference nslp (=|NT−NE|) of the torque converter 14 before start of shifting shown in FIG. 3. In other words, control is executed to correct the timing to terminate the control in which the electronic throttle valve opening $\theta_{TH}$ is temporarily increased. The control amount of the electronic throttle valve 34, that is, the timing t2' to terminate the control in which the electronic throttle valve opening $\theta_{TH}$ is temporarily increased, which is indicated by the broken line in FIG. 3 indicates a control amount that is used in the case where the input/output rotational speed difference nslp of the torque converter 14 is 0. Such correction is performed so as to delay the timing to terminate the control in which the electronic throttle valve opening $\theta_{TH}$ is temporarily increased to a later timing (that is, so as to increase the control amount) as the input/output rotational speed difference nslp before start of shifting is larger, for example. By optimally correcting the control amount of the electronic throttle valve 34 in this way, the turbine speed NT is increased to a necessary and sufficient value as shown in FIG. 3, which provides favorable shifting characteristics while suppressing a shift shock.

Figure 4:
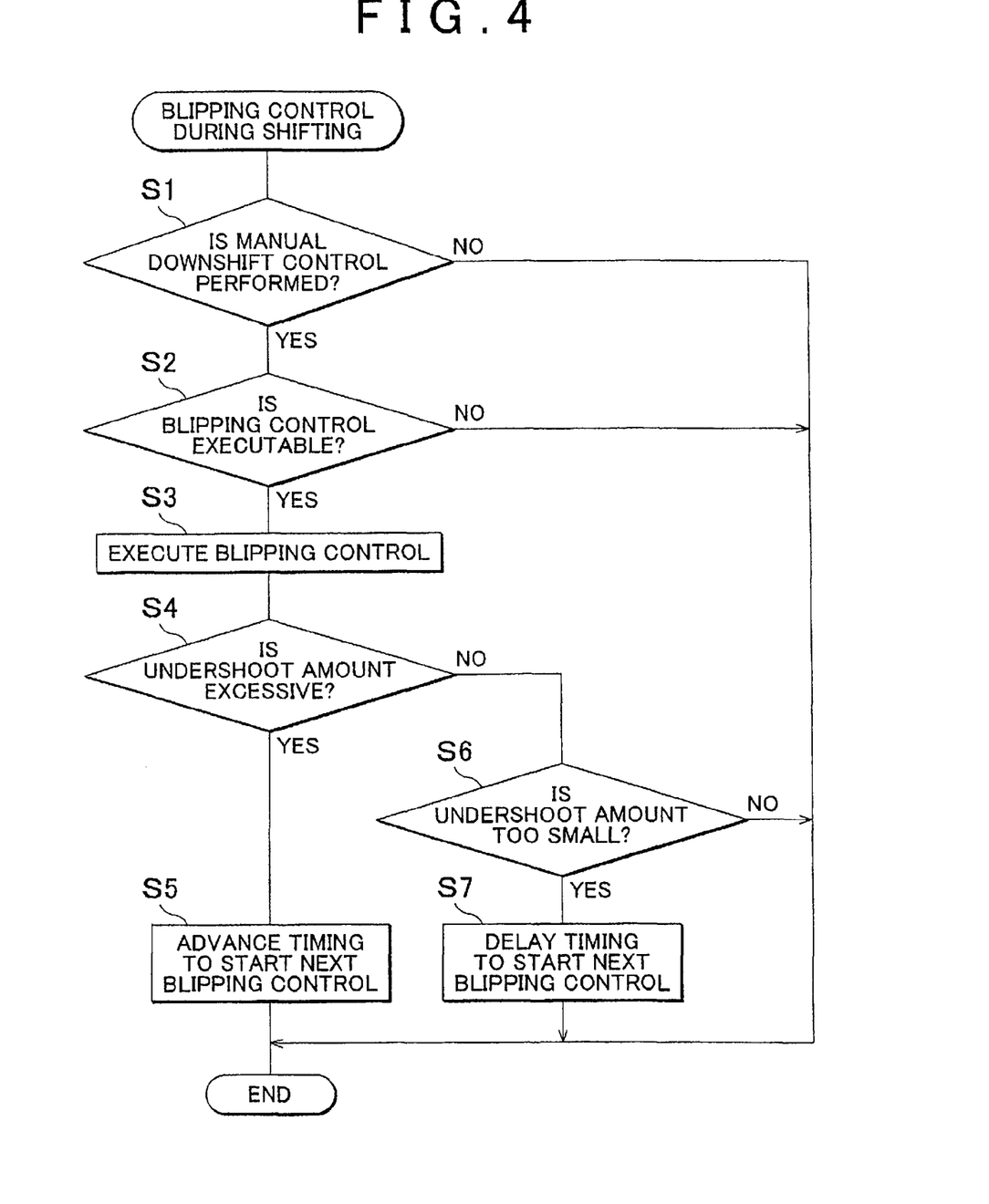
FIG. 4 is a flowchart that illustrates control to change the timing to start the blipping control that is performed by the electronic control device that is provided in the drive device of FIG. 1 when the transmission is manually downshifted.

FIG. 4 is a flowchart that illustrates control to change the timing to start the blipping control that is performed by the electronic control device 20 when the transmission is manually downshifted. The control is executed repeatedly at a predetermined frequency.

First, in step (the term "step" is omitted hereinafter) S1, it is determined whether or not a manual downshift is being performed, that is, downshift control is performed in response to an operation of the shift lever 40 of the shift operation device 48 with the accelerator pedal is released. In the case where the result of determination in S1 is negative, the routine is ended. In the case where the result of determination in S1 is positive, it is determined in S2 whether or not blipping control is executable by the electronic throttle valve 34. In the case where the result of determination in S2 is negative, the routine is ended. In the case where the result of determination in S2 is positive, blipping control is executed in S3 to temporarily increase the opening $\theta_{TH}$ of the electronic throttle valve 34 by a predetermined value. Next, in S4, it is determined whether or not the undershoot amount $\Delta N_{US}$ of the turbine speed NT at start of an inertia phase is excessive, that is, equal to or more than a predetermined upper limit threshold. In the case where the result of determination in S4 is positive, learning control is performed in S5 to advance the timing to start the next blipping control. After that, the routine is ended. In the case where the result of determination in S4 is negative, it is determined in S6 whether or not the undershoot amount $\Delta N_{US}$ of the turbine speed NT at start of an inertia phase is too small, that is, less than a predetermined lower limit threshold. In the case where the result of determination in S6 is positive, learning control is performed in S7 to delay the timing to start the next blipping control. After that, the routine is ended. In the case where the result of determination in S6 is negative, the routine is ended.

Figure 5:
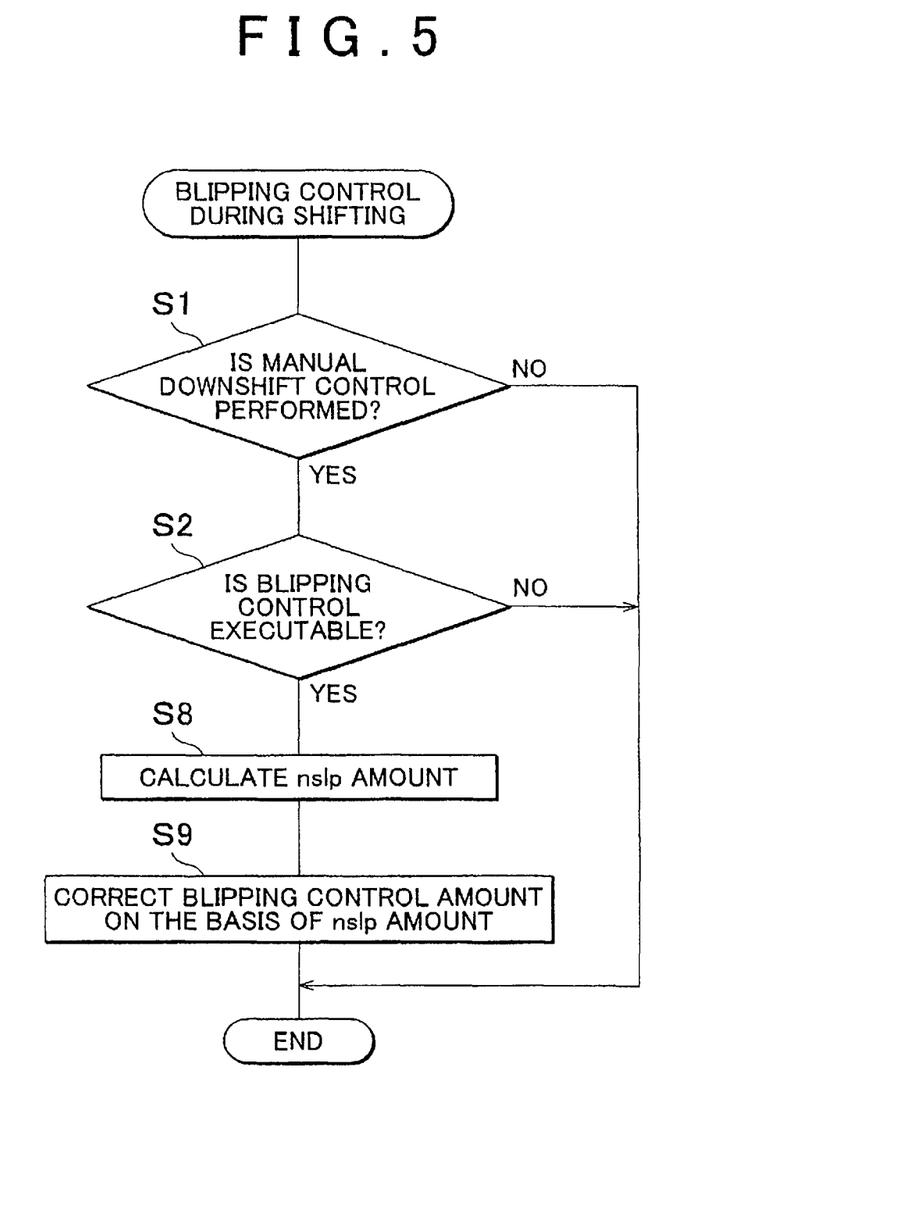
FIG. 5 is a flowchart that illustrates control to correct a control amount that is used in the blipping control that is performed by the electronic control device that is provided in the drive device of FIG. 1 when the transmission is manually downshifted.

FIG. 5 is a flowchart that illustrates control to correct the control amount that is used in the blipping control that is performed by the electronic control device 20 during a manual downshift. The control is executed repeatedly at a predetermined frequency. Steps of the control that are common to those of the control shown FIG. 4 discussed above are denoted by the same reference symbols, and the description of such steps is not repeated.

In the control shown in FIG. 5, in the case where the result of determination in S2 is positive, that is, in the case where it is determined that blipping control is executable by the electronic throttle valve 34, the input/output rotational speed difference nslp (=|NT−NE|) of the torque converter 14 before start of shifting is calculated in S8. Next, in S9, the blipping control amount is corrected on the basis of the input/output rotational speed difference nslp of the torque converter 14 calculated in S8. After that, the routine is ended.

As described above, according to the embodiment, blipping control is performed in which the output torque of the engine 12 which serves as a drive source is changed by the electronic throttle valve 34 which serves as a blipping control device when the automatic transmission 16 is manually downshifted. In addition, the timing to perform the next blipping control is changed in a learning manner on the basis of the undershoot amount $\Delta N_{US}$ of the turbine speed NT at start of shifting of the automatic transmission 16 using relation determined in advance. Hence, it is possible to shorten the time which is required for shifting as much as possible in consideration of the torque capacity of clutches disengaged in the shifting of the automatic transmission 16. That is, it is possible to provide a control device for the vehicle drive device 10 that enhances the response of the automatic transmission 16 while suppressing a shift shock when the automatic transmission 16 is manually downshifted.

In the embodiment, the torque converter 14 is provided between the engine 12 and the automatic transmission 16. The control amount of the output torque of the engine 12 that is used in the blipping control is corrected on the basis of the input/output rotational speed difference nslp of the torque converter 14 using relation determined in advance. Further favorable shifting characteristics can be obtained by suitably correcting the control amount using the electronic throttle valve 34.

An embodiment of the present invention has been described in detail above with reference to the drawings. It should be noted, however, that the present invention is not limited to the embodiment and may be implemented in other modes or forms.

For example, while the drive device 10 includes the electronic throttle valve 34 as a blipping control device that can change the output torque of the engine 12 irrespective of an accelerator operation in the embodiment discussed above, the present invention is not limited thereto. The present invention may also be suitably applied to a drive device that includes a fuel injection device for a diesel engine as a blipping control device.

Although not illustrated specifically, the present invention may be modified in various ways without departing from the scope and spirit of the present invention.

What is claimed is:

1. A control device for a vehicle drive device that includes a drive source that outputs a drive force for running an automatic transmission that has multiple speeds, the control device comprising:
   a blipping control device that performs blipping control in which an output torque of the drive source is changed irrespective of an accelerator operation when a manual downshift of the automatic transmission is performed, and that changes a timing to perform next blipping control in a learning manner on the basis of an undershoot amount of a turbine speed at start of shifting of the automatic transmission;
   wherein the control device advances the next blipping control by a predetermined time in a case where the undershoot amount is equal to or more than a predetermined amount.

2. The control device according to claim 1, wherein the vehicle drive device further includes a torque converter that is provided between the drive source and the automatic transmission, and the blipping control device corrects a control amount of the output torque of the drive source that is used in the blipping control on the basis of a difference between respective rotational speeds of an input shaft and an output shaft of the torque converter.

3. The control device according to claim 1, wherein the blipping control device delays the timing to perform the next blipping control by a predetermined time in the case where the undershoot amount is less than a predetermined amount.

4. The control device according to claim 2, wherein the blipping control device increases the control amount of the output torque of the drive source to be larger as the difference between the respective rotational speeds of the input shaft and the output shaft of the torque converter before start of shifting is larger.

5. The control device according to claim 1, wherein the turbine speed is a rotational speed of an input shaft of the automatic transmission to which the output torque of the drive source is input.

6. The control device according to claim 1, wherein the manual downshift of the automatic transmission is a downshift that is caused by a manual operation with an accelerator pedal released or with the accelerator pedal depressed by an amount less than a predetermined amount.

7. The control device according to claim 1, wherein the blipping control device is a throttle valve.

8. A control method for a vehicle drive device that includes a drive source that outputs a drive force for running an automatic transmission that has multiple speeds, the control method comprising:
   performing blipping control in which an output torque of the drive source is changed when a manual downshift of the automatic transmission is performed; and
   changing a timing to perform next blipping control in a learning manner on the basis of an undershoot amount of a turbine speed at start of shifting of the automatic transmission;

advancing the timing to perform the next blipping control by a predetermined time in a case where the undershoot amount is equal to or more than a predetermined amount.

9. The control method according to claim 8, wherein the blipping control is performed using a throttle valve.

\* \* \* \* \*